United States Patent [19]

Hoek et al.

[11] Patent Number: 6,096,362
[45] Date of Patent: Aug. 1, 2000

[54] STABLE SUSPENSIONS CONTAINING DIPEPTIDE SWEETENER IN WATER

[75] Inventors: Annette C. Hoek, Kerkrade; Suzanne M. F. Lanckohr, Hulsberg; Jacob van Soolingen, Brunssum, all of Netherlands

[73] Assignee: Holland Sweetener Company V.O.F., Geleen, Netherlands

[21] Appl. No.: 09/233,151

[22] Filed: Jan. 19, 1999

Related U.S. Application Data

[63] Continuation of application No. PCT/NL97/00413, Jul. 14, 1997.

[30] Foreign Application Priority Data

Jul. 16, 1996 [NL] Netherlands ............................ 1003600

[51] Int. Cl.$^7$ ...................................................... A23L 1/236
[52] U.S. Cl. ........................................... 426/548; 426/654
[58] Field of Search ...................................... 426/548, 654

[56] References Cited

U.S. PATENT DOCUMENTS 4,384,004   5/1983   Cea et al. .
5,827,562  10/1998   Fry et al. ................................. 426/548

FOREIGN PATENT DOCUMENTS 1 027 113   2/1978   Canada .
  067 595  12/1982   European Pat. Off. .
95/15697    6/1995   WIPO .

Primary Examiner—Leslie Wong
Attorney, Agent, or Firm—Pillsbury Madison & Sutro LLP

[57] ABSTRACT

The invention relates to stable, liquid suspensions containing a dipeptide sweetener in water as well as an agent which keeps the suspension liquid, the dipeptide sweetener being a sweetening salt of an aspartic acid-based dipeptide sweetener and a derivative of a sweetening acid, and the agent used to keep the suspension liquid a component chosen from the group of water-soluble, modified or non-modified polysaccharides or proteins, lipids, sulphonates and phosph (on)ates with surfactant properties at a pH of 3.5 or lower. The invention also relates to a process for the preparation of such suspensions, the sweetening salt, prepared in situ or otherwise, and the other component being mixed thoroughly and intensively.

28 Claims, No Drawings

STABLE SUSPENSIONS CONTAINING DIPEPTIDE SWEETENER IN WATER

This is a Continuation of: International Appln. No. PCT/NL97/00413 filed Jul. 14, 1997 which designated the U.S.

The invention relates to stable, liquid suspensions containing a dipeptide sweetener in water as well as an agent which keeps the suspension liquid, and to a process for the preparation of such suspensions.

Within the scope of the present patent application the term suspension refers to a liquid system in which solid particles, often of very small size, are dispersed throughout the liquid medium under normal conditions of temperature and pressure. The suspension can be called stable if the solid particles are dispersed therein more or less homogeneously through the entire liquid medium and remain thus during a sufficiently long time, i.e. for at least 7 days if the suspension is left alone. The suspensions are called liquid if they have a viscosity of 1500 mPas or less, measured at a shear stress of 45 l/sec. The present invention therefore relates to stable, liquid suspensions having a viscosity of at most 1500 mPas, measured at a shear stress of 45 l/sec.

Stable, liquid suspensions of a dipeptide sweetener in water, viz. suspensions in water of aspartame, in aspartame concentrations of from 10% to 70% by weight, in the presence of an agent which keeps the suspension liquid, are disclosed by WO-95/15697. The aspartame is present in the form of very small particles, and the agent used to keep the suspension liquid is a thickening nutrient polymer, hydrocolloid or gum, optionally in the presence of an emulsifier or a humectant. Such suspensions have recently become commercially available, to be precise under the tradename NutraSweet Custom Liquid®. In the patent application in question it is also stated that comparable suspensions can be obtained of a series, defined in more detail, of salts and metal complexes of aspartame as disclosed, to be precise, by U.S. Pat. No. 3,492,131, U.S. Pat. No. 4,439,460, U.S. Pat. No. 4,029,701, U.S. Pat. No. 3,714,139, U.S. Pat. No. 4,031,258 and U.S. Pat. No. 4,448,716. No instructions whatsoever can, however, be found in WO-95/15697 with regard to the actual preparation of suspensions of such salts and metal complexes, nor any indications concerning their properties. WO-95/15697 deals solely with suspensions of aspartame in water. The purpose of these suspensions of aspartame in water, in particular for applications in the soft drinks industry, is to overcome the drawbacks of powdered aspartame being metered in, such as dusting and loss of product, when soft drinks are being prepared, by making available a rapidly dissolvable, concentrated and readily pumpable form of aspartame having good storage stability, both in terms of chemical stability and physical stability of the suspension. The latter form of stability will hereinafter be referred to, in the present application, as suspension stability. Other forms of stability will, where applicable, in each case be designated separately.

The term dipeptide sweetener in the scope of the present application refers to products having a sweetening power which is many dozens of times stronger than that of sugar, and which are composed of amino acids or amino acid derivatives linked via a peptide bond. The best-known examples of dipeptide sweeteners are aspartame and alitame.

Aspartame ($\alpha$-L-aspartyl-L-phenylalanine methyl ester), hereinafter also referred to as APM, is a dipeptide sweetener having a sweetening force which is approximately 200 times that of sucrose. Aspartame is used as an intense sweetener in many applications, given its good organoleptic properties and low-calorie character. Aspartame is widely used, inter alia, in soft drinks.

Alitame (L-$\alpha$-aspartyl-N-(2,2,4,4-tetramethyl-3-thietanyl)-D-alanine amine hydrate), hereinafter sometimes referred to as ALI, is a dipeptide sweetener having a sweetening power which is approximately 2000 times that of sucrose.

Dipeptide sweeteners such as aspartame in solution are known to be susceptible to decomposition even at ambient temperature and, as a matter of fact, even in the dry state at greatly elevated temperatures. Decomposition of aspartame takes place, inter alia, via hydrolysis of the ester function, with the formation of $\alpha$-L-aspartyl-L-phenylalanine (hereinafter sometimes referred to as AP) and via an internal ring closure reaction thereof, with the formation of 3-carboxymethyl-6-benzyl-2,5-dioxopiperazine (diketopiperazine; hereinafter to be referred to as DKP). In the case of the suspension of aspartame in water according to WO-95/15697 a fraction of the aspartame present therein, said fraction amounting, depending on the temperature and other conditions, to approximately 0.7 to 1.2 wt % of the total weight of the suspension, will be dissolved. It is that dissolved amount of aspartame, in particular, but to a lesser extent also that amount of aspartame present in the solid state which is saturated in terms of moisture content, which is sensitive to decomposition, thus limiting the shelf-life of the suspensions in terms of the acceptable level of impurities or formation of by-products (i.e. in terms of chemical changes). On top of this it is also possible for the quality of the suspension to deteriorate as a result of bacteriological and/or microbiological processes. All this affects the duration of the period during which the suspensions can be kept in an acceptable condition, the so-called shelf-life, which is primarily determined by chemical and microbiological stability. Since the suspensions according to the prior art have a pH of approximately 4 or higher (up to neutral), they represent an excellent substrate, certainly if no preservatives are added, for the growth of microorganisms, which is undesirable in conjunction with the intended applications for foodstuffs. The shelf-life of the suspensions is thus reduced both by microbiological (bacteriological) contamination which may arise and by the fall in the aspartame level and thus a fall in the effective amount of sweetening power per amount in terms of weight of the product. The effective shelf-life of such suspension products will therefore, as a rule, not exceed approximately 3 months, and will be even less if storage takes place under conditions warmer than room temperature (tropical countries), which is considered inadequate: a shelf-life of at least 6 months (at 20° C.) is called for.

There was therefore a need for stable, liquid suspensions to be provided which contain a dipeptide sweetener in water and which also contain an agent which keeps the suspension liquid, have a longer shelf-life and are also less sensitive to microbiological or bacteriological contamination arising.

There was also a need for a simple process to be provided for the preparation of such suspensions. Moreover, the suspensions should also have an adequate suspension stability. Within the context of the present invention, the suspension stability is considered adequate if it concerns a suspension which (i) keeps for at least 7 days in liquid (i.e. viscosity <1500 mPas, measured at a shear stress of 45 l/sec), homogeneous form without settling of the solids present and without the formation of a foam layer and/or clear supernatant, and (ii) can, if after that period such settling out has nevertheless taken place, be reconverted, in a simple manner, into the original homogeneous suspension.

Surprisingly, stable, liquid suspensions containing a dipeptide sweetener in water as well as an agent which keeps the suspension liquid have now become available, in which the dipeptide sweetener is a sweetening salt of an aspartic acid-based dipeptide sweetener and a derivative of a sweetening acid and in which the agent used to keep the suspension liquid is a component chosen from the group of water-soluble, modified or non-modified polysaccharides or proteins, lipids, sulphonates and phosph(on)ates with surfactant properties at a pH of 3.5 or lower. The stable, liquid suspensions according to the invention have a good shelf-life and are not susceptible or hardly susceptible to microbiological or bacteriological contamination arising, while at all times during their shelf-life they provide a high effective level of sweetening power per amount in terms of weight of the suspension. With respect to their required suspension stability they amply meet the conditions set hereinabove.

Sweetening salts of an aspartic acid-based dipeptide sweetener and a derivative of a sweetening acid as meant here are described in CA-A-1027113 and ES-A-8604766 and also in the Belgian Patent Application No. 9500836, unpublished at the priority date of the present invention (which inter alia led to EP-A-0768041). Derivatives of sweetening acids as meant here are (derivatives of) organic acids corresponding to an intense sweetener which is not derived from aspartic acid. From not a single of the documents mentioned here, in which, incidentally, possible applications for the sweetening salts in question are indicated only in the most general terms without concrete applications being demonstrated, can it be deduced or expected that said sweetening salts might be usable in stable suspensions.

Examples of suitable sweetening salts which, according to the invention, can be used in the suspensions are: salts of aspartame (APM) or alitame (ALI) with acesulphamic acid (i.e. the acid from which Ace-K is derived), with saccharinic acid (1,2-benz-isothiazol-3(2H)-one-1,1-dioxide), with cyclohexylsulphonic acid (cyclamate). The most suitable is the salt of aspartame and acesulphamic acid, hereinafter sometimes referred to as APM-Ace or as the APM-Ace salt; suitable, in particular, is the exceptionally stable nonhygroscopic product as obtained in the solid state according to the process of the Belgian Patent Application No. 9500836, unpublished at the priority date of the present invention. In said process, aspartame and a salt of acesulphamic acid are allowed to react in an aqueous medium in the presence of a strong acid and the APM-Ace formed is isolated from the reaction mixture.

That the suspensions according to the invention should have such excellent properties is surprising, in the first instance, because if sweetening salts of an aspartic acid-based dipeptide sweetener and a derivative of a sweetening acid are used as a dipeptide sweetener, the use of thickeners to keep the suspension liquid and homogeneous, as recommended according to the teaching of WO-95/15697, does not have a beneficial effect. This is demonstrated irrefutably in the comparative examples included in the experimental section.

WO-95/15697 recommends the following list of nutrient polymers, hydrocolloids or gums having a thickening effect: sodium carboxymethyl cellulose, extract from brown algae, gum arabic, carrageenin, xanthan gum, guar seed flour, hydroxypropylmethyl cellulose (HPMC), pectin, locust bean flour, sodium alginate, propylene glycol alginate, caramel and mixtures thereof. According to the findings of the present inventors the products mentioned here and in particular the products whose use is described in the examples of the said patent application are not or are hardly satisfactory when stable suspensions according to the invention are prepared, although in the said patent application they are indeed recommended as agents to obtain liquid suspensions of many aspartame salts and metal complexes other than the sweetening salts thereof to be used according to the present invention. It should be noted in this context that with respect to the pH of the suspensions obtained of the sweetening salts to be used within the context of the present invention and to the pH of suspensions obtained of salts as meant in WO-95/15697, respectively, there are no essential differences.

The effect of the agents used in WO-95/15697 to keep the suspension liquid is ascribed, in the said patent application, to the fact that foaming in the course of the preparation of aspartame suspensions is prevented. In contrast thereto, if, for example, sodium carboxymethyl cellulose (CMC) is used in (attempts to carry out) the preparation of suspensions of the salt of, for example, aspartame and acesulphamic acid, the APM-Ace salt, is used, very strong foaming occurs. Other agents, for example xanthan gum, in (attempts to carry out) the preparation of suspensions of the APM-Ace salt give rise to the formation of sediment and a separate water phase. Thus, in not a single case was a stable suspension found for the sweetening salts of, for example, aspartame and alitame, with the derivatives of sweetening acids.

It has now been found by the inventors that such stable suspensions of sweetening salts of a dipeptide sweetener and a sweetening acid can, however, be obtained if a component is present, as an agent which keeps the suspension liquid, which is chosen from the group of water-soluble, modified or non-modified polysaccharides or proteins, lipids, sulphonates and phosph(on)ates with surfactant properties at a pH of 3.5 or lower.

Thus the agents in question are distinctly different from the agents used according to the prior art in stable suspensions of dipeptide sweeteners. If for no other reason this is the case, for example, because the (thickening) agents mentioned in the prior art which keep the suspension liquid are often less active (such as, for example, sodium carboxymethyl cellulose) at a pH below 4 or because they are hydrolysed under such conditions (such as, for example, the products containing ester groups) or decompose in some other way, which, given the low concentrations at which these agents are used, leads to significant effects in terms of surface activity.

Examples of water-soluble, modified or non-modified polysaccharides or proteins, lipids, sulphonates and phosph (on)ates with surfactant properties at a pH of 3.5 or lower which can suitably be used in the stable suspensions within the context of the present invention are: lipids such as, for example, (modified) lecithins, inter alia hydroxylated lecithins; agar-agar; gelatins; amidated pectins; cellulose; polydextrose; starch and mono-, di- and/or tri-starch phosph(on) ates; hydroxyalkyl-substituted starches such as, for example, hydroxypropyl starch and mono-, di- and/or trihydroxypropyl starch phosphates and also oxidated forms of such starches; dextrins; alkyl celluloses such as, for example, methyl cellulose or ethyl methyl cellulose; sucroglycerides; (modified) polyethylene glycols; hydroxyalkyl-substituted celluloses such as, for example, hydroxymethyl cellulose, hydroxyethyl cellulose (HEC), hydroxymethyl ethyl cellulose, hydroxypropyl ethyl cellulose, hydroxypropyl cellulose, hydroxybutyl cellulose, hydroxypropyl methyl cellulose; polyethylene oxide polymers and/or polypropylene oxide polymers; other phosph(on)ates and sulphonates with surfactant properties; or mixtures or combinations thereof; all such products being suitable if they are sufficiently surface-active at a pH of 3.5 or lower.

Most of these products are commercially available in various qualities. It goes without saying that regarding the products to be employed in foodstuffs the acceptability customary for foodstuffs is observed.

Particular preference is given to the use of hydroxyethyl cellulose (HEC), hydroxypropyl cellulose (HPC), and gelatin or combinations thereof.

The concentration at which said water-soluble, modified or non-modified polysaccharides or proteins, lipids, sulphonates and phosph(on)ates with surfactant properties at a pH of 3.5 or lower are used is not particularly critical, in general, but will as a rule be in the range from 0.001 to 2.0 wt % relative to the total weight of the suspension. Preferably said concentration is chosen to be in the range from 0.15 to 1.2 wt %.

If required it is also possible for an antifoaming agent or emulsifier to be present in the suspensions according to the invention in a very low concentration, preferably less than 0.1 wt %.

Besides, the results found according to the present invention are also surprising because, when the sweetening salts as used within the scope of the present invention are employed, a larger fraction of the dipeptide added via the sweetening salt will be present in solution than would be present of the dipeptide in solution if, instead of the sweetening salt derived from the dipeptide, the dipeptide itself had been the starting material. Those skilled in the art would certainly, in such a case, expect a greater degree of instability than is found in the suspensions of the present invention, certainly given the lower pH thereof. Said expectation of those skilled in the art is confirmed, inter alia, by the teaching of WO-95/15697 where it is stated, on page 7, lines 18–22, that aspartame when used in concentrated syrups for fountain-dispensed drinks is susceptible to accelerated decomposition in connection with the low-pH environment and concentrations of the components present.

Studies on behalf of the applicant have now shown that the microbiological and/or bacteriological stability of the sweetening salts used within the scope of the present invention is excellent in the solid state and in suspension.

The particle size of the sweetening salts used within the scope of the invention for the preparation of the suspensions in question is not particularly critical, but will in general not exceed 1000 μm. The use of sweetening salt with a particle size <350 μm offers advantages with respect to the simplicity of the preparation of the suspensions. The simplest preparation is achieved if the particle size of the sweetening salt is in the range of <100 μm. By a suitable choice of the particle size of the sweetening salt to be used those skilled in the art are able to achieve further fine tuning of the desired method of preparation.

The quantity to be used, within the scope of the present invention, of the sweetening salts in the suspensions will in general be from 10 to 70 wt % (determined relative to the total weight of the suspension). Suspensions containing sweetening salt of an aspartic acid-based dipeptide sweetener and a derivative of a sweetening acid will preferably contain a level of sweetening salt in the range from 20 to 65 wt %, most preferably from 30 to 60 wt %, because in that case the stablest suspensions (both in terms of suspension stability and also in terms of their chemical and microbiological or bacteriological stability) are obtained. All this is easily determined by those skilled in the art, depending on the type and quantity of the agent which is to be used in the suspension to keep the suspension liquid and which has surfactant properties at a pH of 3.5 or lower.

Apart from the sweetening salts to be used according to the invention it is also possible for nutrient sugars and/or other sweeteners to be additionally present in the suspensions according to the invention. The following can be mentioned by way of example in this context: aspartame, alitame, acesulphame-K or other derivatives of acesulphamic acid, saccharinates, cyclamates, glycyrrhizine, thaumatin, monelline, neohesperidinedihydrochalcone (in short NHDC), sucralose, sorbitol, mannitol, xylitol, hydrogenated starch hydrolysates, dextrins, maltitol, lactitol, isomalt, saccharose, dextrose, glucose syrups, fructose, fructose syrups and the like, or combinations thereof. Additionally, inorganic salt, for example of sodium, potassium, calcium or magnesium may be present.

The preparation of stable suspensions according to the invention is relatively simple assuming a correct choice of the agents which keep the suspension liquid. Depending on the concentration used of the sweetening salt of the dipeptide sweetener and the sweetening acid, in conjunction with the agents which keep the suspension liquid, a more or less stable suspension will be obtained, but the suspension stability will in all cases meet the conditions stated hereinabove. It is also possible, depending on the amounts used of these, for some foaming to occur during the preparation of the suspensions and/or (even in the case of preparation at higher temperatures) for problems to arise with respect to stirrability and processability of the system. It is nevertheless possible for those skilled in the art to find relevant solutions in a relatively simple manner, partly in accordance with the instructions in the present application, for example by adding a small amount of an antifoaming agent.

The invention thus also relates to processes for the preparation of stable, liquid suspensions containing a dipeptide sweetener in water as well as an agent which keeps the suspension liquid, a sweetening salt, prepared in situ or otherwise, of an aspartic acid-based dipeptide sweetener and a derivative of a sweetening acid being thoroughly and intensively mixed with a component chosen from the group of water-soluble, modified or non-modified polysaccharides or proteins, lipids, sulphonates and phosph(on)ates with surfactant properties at a pH of 3.5 or lower. Said mixing may take place by means of a standard blender for obtaining emulsions or suspensions.

For the purpose of the preparation of the suspensions according to the present invention such an amount of the chosen sweetening salt of the dipeptide sweetener and a sweetening acid as has been obtained in accordance with the preparation methods available for this purpose, with or without further processing and shaping, but preferably in powdered form with a particle size of <100 μm is, in a first embodiment, introduced into water. The sweetening salt may also be added in the form of a wet crystal cake or the like. The agent which keeps the desired suspension liquid may have previously been introduced into the water, but it may also be metered in after the addition of the sweetening salt. If required, an emulsifier is also added. All this preferably takes place at ambient temperature. The system obtained is then mixed thoroughly and intensively. Said mixing may occur by means of a standard blender for obtaining emulsions or suspensions. A highly suitable apparatus for the preparation thereof is, for example, an Ultra-Thurax® blender (Janke & Kunkel GmbH) or a Microfluidizer® (Microfluidics Corporation). The agent which keeps the suspension liquid, i.e. the water-soluble, modified or non-modified polysaccharides or proteins, lipids, sulphonates and phosph(on)ates with surfactant properties at a pH of 3.5 or lower may also be added to, and mixed with, the sweetening salt to be used, prior to the latter being metered into the water. It goes without saying that the metering sequence may also be reversed, as long as the ultimate mixing involved in the preparation of the suspension is very intensive. In the course of the intensive mixing, the original particles of the sweetening salt are, if still necessary, further reduced in size. The particle size of the sweetening salt which remains present as a solid in the suspension will, as a rule, be less than 20 μm. The temperature of the system may rise somewhat during the intensive mixing, for example up to 50 to 60° C., but that is not a problem since the system as a whole will be at such an elevated temperature only for a short time. Immediately after the preparation of the suspension the temperature, external cooling being applied if required, will drop back to ambient temperature. The suspensions thus obtained are suspension-stable for at least 7 days; during that period they do not exhibit any presence of a foam layer or of a (partly) clear water phase or of sediment. As soon as, after at least 7 days, some sedimentation (settling of the suspension) and/or formation of a (partly) clear water phase occurs, the system can be converted back into a homogeneous, stable suspension by simple shaking or stirring.

In a second suitable embodiment the sweetening salt of an aspartic acid-based dipeptide sweetener and a derivative of a sweetening acid are prepared in situ during the preparation of the suspension. In this embodiment the following are added to one another, in any metering sequence and in amounts chosen in accordance with the desired end product: water, a dipeptide and a quantity, equivalent thereto on a molar basis, of a sweetening acid (or a derivative thereof in combination with an equimolar amount of a strong acid, for example HCl, in that case an inorganic salt being formed at the same time, for example KCl if Ace-K is the starting material), and an agent which keeps the suspension liquid, as should be used in accordance with the present invention. The system obtained is then mixed thoroughly and intensively. Said mixing may take place by means of a standard blender for obtaining emulsions or suspensions.

In a third embodiment which is likewise very suitable a suspension—which may or may not be liquid and homogeneous—is first prepared of a dipeptide sweetener in water, in the presence or absence of agents (for example in accordance with the agents mentioned in WO-95/15697) which keep the dipeptide suspension liquid. This system is then admixed with a quantity, equivalent in molar terms to the dipeptide sweetener, of a sweetening acid (or a derivative thereof in combination with an equimolar quantity of a strong acid, for example HCl), and with an agent which keeps the suspension liquid such as is to be used in accordance with the present invention. The system obtained is then mixed thoroughly and intensively. Said mixing may take place by means of a standard blender for obtaining emulsions or suspensions.

In-situ preparation as in the above-described second and third embodiment provides considerable economic advantages, inter alia as a result of a shorter preparation time starting from the dipeptide sweetener. Moreover, the third embodiment has the additional advantage that smaller particles are then formed, which leads to even stabler suspensions.

The invention will hereinafter be illustrated with reference to a few examples and comparative examples without, however, being limited thereto in any sense.

The sweetening salt, used in the suspensions studied, of aspartame and acesulphamic acid (hereinafter APM-Ace) was prepared according to the method of Experiment 4a of the Belgian Patent Application No. 9500836, unpublished at the priority date of the present invention. This was done as follows:

To 2 l of water at 20° C., 608 g of APM and 410 g of Ace-K (each 2.0 mol) were added successively, the slurry formed was then brought to 50° C., and 370 g of 20% strength HCl in water were metered in, with stirring, over a period of 30 minutes. In the process, the initially fairly voluminous slurry became a less voluminous slurry. At the end of the HCl metering, the slurry obtained was cooled to 10° C., over a period of approximately 30 minutes via indirect heat transfer using a cooling medium of 0° C., and was filtered off. The crystalline material obtained was washed with a minimal amount of ice water and dried in vacuo at 40° C. In total, 820 g (i.e. a yield of 90%) were thus obtained of a white product which, according to $^1$H-NMR consisted entirely of the 1:1 salt of APM and acesulphamic acid, with a purity of >99%. The moisture content was 0.12%. From a portion of this product a fraction was isolated, via screening operations, which contained particles of <100 μm.

Example I

30% APM-Ace with Gelatin

To a solution of 140 g of deionized water and 0.5 g of gelatin (i.e. 0.25 wt % relative to water and sweetener) 60 g of APM-Ace were added. After homogenization by means of stirring the mixture was pumped over in a microfluidizer. A suspension was produced which was stable for more than 7 days without any separation.

Example II

30% APM-Ace with Gelatin and HEC

To a solution of 140 g of deionized water and 0.1 g of gelatin and 0.9 g of hydroxyethyl cellulose (HEC) 60 g of APM-Ace were added. After homogenization by means of stirring the mixture was pumped over in a microfluidizer. A suspension was produced which was stable for more than 7 days without any separation.

Example III

30% APM-Ace with HEC and Antifoaming Agent

To a solution of 140 g of deionized water and 1.0 g of HEC and 0.1 g of antifoaming agent (Rhodorsil) 60 g of APM-Ace were added. After homogenization by means of stirring the mixture was pumped over in an Ultra-Thurax. A suspension was produced which was stable for more than 7 days without any separation.

Example IV

50% APM-Ace with HPC

To a solution of 140 g of deionized water and 1.4 g of hydroxypropyl cellulose (HPC), i.e. 0.5 wt % relative to water and sweetener, 140 g of APM-Ace were added. After homogenization the mixture was pumped over in a microfluidizer. The suspension formed was stable for more than 7 days without any separation.

Example V

50% APM-Ace with Gelatin

To a solution of 140 g of deionized water and 2.8 g of gelatin (i.e. 1.0 wt % relative to water and sweetener) 140 g of APM-Ace were added. After homogenization by means of stirring the mixture was pumped over in a microfluidizer. A suspension was produced which was stable for more than 7 days without any separation.

Example VI

In situ; APM-Ace 30% with HPMC

To a solution of 140 g of deionized water and 1.0 g of hydroxypropyl methyl cellulose (HPMC) 39 g of APM were added. After homogenization by means of stirring the mixture was pumped over in a microfluidizer and 21 g of acesulphamic acid were then added gradually while pumping over continued. The suspension formed was stable for more than 7 days without any separation.

Comparative Example A

30% APM-Ace with CMC

To a solution of 140 g of deionized water and 0.4 g of sodium carboxymethyl cellulose (CMC), i.e. 0.2 wt % relative to water plus sweetener, 60 g of APM-Ace were added which had been prepared in the above manner. After homogenization by means of stirring the mixture was pumped over in a microfluidizer. A three-phase system was formed which consisted of sediment, clear water phase and a thick foam layer, but not a stable suspension.

Comparative Example B

30% APM-Ace with CMC Plus Gum Arabic

To a solution of 140 g of deionized water and 0.4 g of sodium carboxymethyl cellulose (CMC) and 0.4 g of gum arabic 60 g of APM-Ace were added. After homogenization by means of stirring the mixture was pumped over in a microfluidizer. A three-phase system was likewise formed which consisted of sediment, clear water phase and a thick foam layer, but not a stable suspension.

Comparative Example C

30% APM-Ace with Xanthan Gum

To a solution of 140 g of deionized water and 0.4 g of xanthan gum 60 g of APM-Ace were added. After homogenization by means of stirring the mixture was pumped over in a microfluidizer. Within two days, a system was formed which consisted of sediment, partial suspension and above this a water phase, i.e. not a stable suspension.

Comparative Example D

30% APM with HPMC

To a solution of 140 g of deionized water and 0.4 g of hydroxypropyl methyl cellulose (HPMC), 60 g of aspartame (APM) were added batchwise while pumping over took place at the same time in a microfluidizer. Even before all of the APM had been added, an unmanageable, thick paste up to solid pulp was formed. It therefore appears to be impossible, with the aid of HPMC, to prepare liquid suspensions which contain more than 30 wt % of APM.

Via high-pressure liquid chromatography (HPLC), samples from Examples I to VI inclusive, immediately after preparation and after being left to stand (at room temperature) for 18 days, were analysed for any increase of possible breakdown products of aspartame, viz. for DKP, AP and α- and β-aspartyl-aspartylphenylalanine ($A_2$PM). It was found that, compared with a commercially available 50 wt % suspension of APM with CMC (with a pH of 5.0), in total only half the amount of breakdown products of APM is formed (namely approximately the same degree of breakdown producing AP, but much less DKP and no formation of $A_2$PM at all). The suspensions according to the invention therefore have twice as long a shelf-life.

The suspensions of examples I to VI inclusive were also stored for a fairly long period of time in closed bottles under stable temperature conditions (room temperature). After a period varying from some to many weeks the suspension showed some settling or thickening; the latter was seen clearest in the samples with the highest solids contents. However, by once shaking up the sample bottle containing the settled or settling or thickened suspension a liquid stable suspension (i.e. a suspension having a viscosity of at most 1500 mPas at a shear stress of 45 l/sec, in which the solid particles are and remain more or less homogeneously dispersed for at least 7 days) was obtained again in all cases, even after the sample had been at rest for more than 8 months. For instance, by once shaking up the meanwhile thickened 50% suspension of example IV, after a period of rest of 8 months, a stable liquid suspension was obtained again, having a viscosity of 560 mPas at said shear stress.

In addition, the sample of example IV, after a storage time of about 8 months (at room temperature), was subjected to HPLC analyses in order to determine any increase in possible aspartame breakdown products, viz. DKP, AP and α- and β-aspartyl-aspartylphenylalanine ($A_2$PM); it was found that after 8 months merely 0.8 wt. % of AP had formed, while the total of products such as DKP and Phe formed was less than 0.4 wt. %. So the salt shows only a very slight degree of breakdown. Also, in spite of the fact that for instance no sodium benzoate had been added, there was not any microbiological contamination after 8 months. Not any aerobic colonizing unit per gram of slurry was found after 8 months. The suspensions according to the invention thus show an extremely good shelf life behaviour.

We claim:

1. A stable, liquid suspension comprising:
   (a) a dipeptide sweetener which is a sweetening salt of an aspartic acid-based dipeptide sweetener and a derivative of a sweetening acid,
   (b) an agent which keeps the suspension liquid wherein said agent comprises a water-soluble, or modified polysaccharide or protein, lipid, sulphonate or phosph(on)ate having surfactant properties at a pH of 3.5 or less, and
   (c) water.

2. A suspension according to claim 1, wherein said sweetening salt is selected from the group consisting of salts of aspartame and acesulphamic acid, saccharinic acid or cyclohexylsulphonic acid and the salts of alitame and acesulphamic acid, saccharinic acid or cyclohexylsulphonic acid.

3. A suspension according to claim 2, wherein said sweetening salt is the salt of aspartame and acesulphamic acid.

4. A suspension according to claim 3, wherein said salt of aspartame and acesulphamic acid is obtained by allowing aspartame and a salt of acesulphamic acid to react in an aqueous medium in the presence of a strong acid and isolating the salt formed from the reaction mixture.

5. A suspension according to claim 1, wherein said agent used to keep the suspension liquid comprises hydroxyethyl cellulose, hydroxypropyl cellulose, gelatin or a combination of any thereof.

6. A suspension according to claim 1 or 5, wherein the concentration of the agent (b) used to keep the suspension liquid is 0.001 to 2 wt. % relative to the total weight of the suspension.

7. A suspension according to claim 1, wherein said suspension contains an antifoaming agent or an emulsifier.

8. A suspension according to claim 1, wherein the particle size of the sweetening salt that is present in the suspension is <20 μm.

9. A suspension according to claim 1, wherein said suspension contains the sweetening salt in an amount of 10 to 70 wt. %.

10. A suspension according to claim 1, wherein said suspension contains nutrient sugars and/or other sweetening substances.

11. A process for the preparation of stable, liquid suspensions containing a dipeptide sweetener in water as well as an agent which keeps the suspension liquid, comprising thoroughly and intensively mixing a sweetening salt, prepared in situ or otherwise, of an aspartic acid-based dipeptide sweetener and a derivative of a sweetening acid with said agent which is selected from the group consisting of water-soluble, modified or non-modified polysaccharides or proteins, lipids, sulphonates and phosph(on)ates having surfactant properties at a pH of 3.5 or less.

12. A process according to claim 11, wherein said sweetening salt is selected from the group consisting of salts of aspartame and acesulphamic acid, saccharinic acid or cyclohexylsulphonic acid and the salts of alitame and acesulphamic acid, saccharinic acid or cyclohexylsulphonic acid.

13. A process according to claim 12, wherein said sweetening salt is the salt of aspartame and acesulphamic acid.

14. A process according to claim 13, wherein said salt of aspartame and acesulphamic acid is obtained by allowing aspartame and a salt of acesulphamic to react in an aqueous medium in the presence of a strong acid and isolating the salt formed from the reaction mixture.

15. A process according to claims 11 or 12, wherein the sweetening salt is used with a particle size <100 μm.

16. A process according to claim 11, wherein the agent is hydroxyethyl cellulose, hydroxypropyl cellulose, gelatin or combinations thereof.

17. A process according to claim 11, wherein the concentration of the agent is in the range of 0.001 to 2 wt. % relative to the total weight of the suspension.

18. A process according to claim 11, wherein said suspension is prepared so as to include an antifoaming agent.

19. A process according to claim 11, wherein said sweetening salt is prepared in situ during the preparation of the suspension.

20. A process according to claim 19, wherein a sweetening acid or a derivative thereof is applied in an equimolar quantity relative to the dipeptide sweetener, in combination with an equimolar quantity of a strong acid.

21. A process according to claim 11, wherein a quantity of sweetening salt is used so that the suspension obtained contains 10 to 70 wt. % of said sweetening salt.

22. A process according to claim 11, wherein said suspension is prepared so as to include nutrient sugars and/or other sweetening substances.

23. A suspension according to claim 1 or 5, wherein the concentration of the agent (b) used to keep the suspension liquid is 0.15 to 1.2 wt % relative to the total weight of the suspension.

24. A suspension according to claim 1, wherein said suspension contains the sweetening salt in an amount of 20 to 65 wt. %.

25. A suspension according to claim 1, wherein said suspension contains the sweetening salt in an amount of 30 to 60 wt. %.

26. A process according to claim 11, wherein a quantity of sweetening salt is used so that the suspension obtained contains 20 to 65 wt. % of said sweetening salt.

27. A process according to claim 11, wherein a quantity of sweetening salt is used so that the suspension obtained contains 30 to 60 wt. % of said sweetening salt.

28. A process according to claim 11, wherein the concentration of the agent is in the range of 0.15 to 1.2 wt. % relative to the total weight of the suspension.

* * * * *